United States Patent [19]

Sturzl et al.

[11] Patent Number: 4,771,184

[45] Date of Patent: Sep. 13, 1988

[54] ELECTRONIC SWITCH APPARATUS

[75] Inventors: Wilhelm Sturzl, Winkelhaid; Peter Grundl, Erlangen, both of Fed. Rep. of Germany

[73] Assignee: Diehl GmbH & Co., Nuremberg, Fed. Rep. of Germany

[21] Appl. No.: 6,479

[22] Filed: Jan. 23, 1987

[30] Foreign Application Priority Data

Feb. 12, 1986 [DE] Fed. Rep. of Germany ....... 3605658

[51] Int. Cl.[4] ............................................ H03K 17/00
[52] U.S. Cl. ........................................ 307/11; 307/38; 307/39; 307/41
[58] Field of Search ...................... 307/9, 10 R, 11, 39, 307/10 BP, 112, 41, 113, 115, 38, 125, 130, 34, 35, 40, 37, 19, 29; 340/52 R, 52 A, 52 D, 52 F; 361/160, 170, 189, 190, 174, 188, 191

[56] References Cited

U.S. PATENT DOCUMENTS

| 3,416,001 | 12/1968 | Fistell ................................. 307/112 |
| 3,467,835 | 9/1969 | Cola ................................... 307/125 |
| 3,689,806 | 9/1972 | Saita ........................... 307/10 LS X |
| 3,723,749 | 3/1973 | Shapiro ................................ 307/38 |
| 3,860,910 | 1/1975 | Hudson ................................ 307/38 |
| 3,872,371 | 3/1975 | Williams ........................... 307/38 X |
| 4,029,991 | 6/1977 | Schultz ....................... 307/10 LS X |
| 4,054,802 | 10/1977 | Mock ............................. 307/112 X |
| 4,063,147 | 12/1977 | Hatanaka et al. ................. 307/35 X |
| 4,185,205 | 1/1980 | Jagoda et al. ........................ 307/38 |
| 4,288,990 | 9/1981 | Schulz ............................. 307/39 X |
| 4,322,632 | 3/1982 | Hart et al. ............................ 307/41 |
| 4,480,197 | 10/1984 | Hollaway ........................ 307/39 X |
| 4,575,640 | 3/1986 | Martin ............................. 307/39 X |
| 4,659,941 | 4/1987 | Quiros et al. .................... 307/39 X |

Primary Examiner—William M. Shoop, Jr.
Assistant Examiner—Paul Ip
Attorney, Agent, or Firm—Scully, Scott, Murphy & Presser

[57] ABSTRACT

An electronic switch apparatus with a capacitor power supply portion which superimposes a current on a consumer circuit encompassing a plurality of power or current consumers which are individually actuatable by a control circuit; for example, consumers including a display module or subassembly, a relay and a control device. At least two of the power or current consumers are connected in series, wherein a switch branch line is connected in parallel with each of these current consumers, wherein the branch line is not conductive when a current flows through the switched-on current consumer which is connected in parallel therewith, which current is also adequate for the other current consumer, and wherein the branch line conducts a current which is adequate for the other current consumer when either no current flows through the power or current consumer connected in parallel therewith or a current flows therethrough which is itself is insufficient for the needs of the other current consumer.

8 Claims, 1 Drawing Sheet

ELECTRONIC SWITCH APPARATUS

BACKGROUND OF THE INVENTION

1. Field of the Invention

The present invention relates to an electronic switch apparatus with a capacitor power supply portion which superimposes a current on a consumer circuit encompassing a plurality of power or current consumers which are individually actuatable by a control circuit; for example, consumers including a display module or subassembly, a relay and a control device.

2. Discussion of the Prior Art

Capacitor power supplies possess a capacitor instead of a transformer. It has been indicated in practice that capacitor power supplies are more economical and less susceptible to trouble then are power supplies which contain windings. This has shown itself to be particularly advantageous for a switch apparatus employed in household electronics; for example, such as timers for kitchen ranges.

A capacitor power supply segment or circuit superimposes a current on the consumer circuit, whose magnitude is dependent upon the size of the capacitor. In usual consumer circuits, the current consumers are connected in parallel with each other. In accordance therewith, the current which is superimposed by the capacitor power supply portion must be as high as the sum of the part currents which are required by the current consumers. This rapidly leads to the necessity of arranging a capacitor with a higher capacitance in the capacitor power supply. Such a capacitor has not only large dimensions, but is also quite expensive.

SUMMARY OF THE INVENTION

Accordingly, it is an object of the present invention to provide a switch apparatus of the above-mentioned type, in the capacitor power supply portion of which a capacitor possessing a low capacitance will be adequate for supplying power or current consumers with a comparatively high demand of current.

Inventively, the foregoing object is achieved in a switch apparatus of the type under consideration in that at least two of the power or current consumers are connected in series, wherein a switch branch line is connected in parallel with each of these current consumers, wherein the branch line is not conductive when a current flows through the switched-on current consumer which is connected in parallel therewith, which current is also adequate for the other current consumer, and wherein the branch line conducts a current which is adequate for the other current consumer when either no current flows through the power or current consumer connected in parallel therewith or a current flows therethrough which in itself is insufficient for the needs of the other current consumer.

Through the connection in series of the current consumers there is achieved that these do not increase the current which is required. The capacitor in the capacitor power supply portion thereby does need not be dimensioned in conformance with the sum of the currents which is necessary for the current consumers. It is adequate to so dimension the capacitor that the current which is superimposed on the consumer circuit will conform with the demands on current by the largest power or current consumer.

Through utilization of the branch lines there is ensured that, when one of the current consumers which is connected in series is switched-off; in essence, which does not conduct any current, the other current consumer will nevertheless still be passed through by the necessary amount of current.

Pursuant to a preferred embodiment of the invention, those kinds of power or current consumers are connected in series which have a comparatively high current requirement. In effect, the superimposed current need not correspond to the sum of the two high currents which are required for these current consumers. Current consumers having a lower current requirement are preferably connected in parallel with current consumers possessing higher current requirements. Thereby, the superimposed current need only hereby correspond to the sum of a higher and of a lower current.

In order to achieve that the superimposed current can always flow, the branch lines are so connected in sequence, that the current which is delivered by the capacitor power supply portion will also flow when the current consumers which are connected in series do not conduct any current.

A further embodiment of the invention is characterized in that in at least one of the branch lines there is arranged a switch which is controlled by the control device, and wherein the switch is concurrently an on-off switch for the power or current consumer which is connected in parallel therewith, so as to switch off the latter through short-circuiting. As a consequence thereof, either the branch line or the current consumer which is connected in parallel therewith is conductive, whereby only one switch is necessary for this purpose; for example, a transistor.

BRIEF DESCRIPTION OF THE DRAWING

Further novel features and advantages of the invention may now be readily ascertained from the following detailed description of an exemplary embodiment thereof, taken in conjunction with the single FIGURE, illustrating in a block circuit diagram, a switch apparatus for a short-term timer.

DETAILED DESCRIPTION

Figure 1:
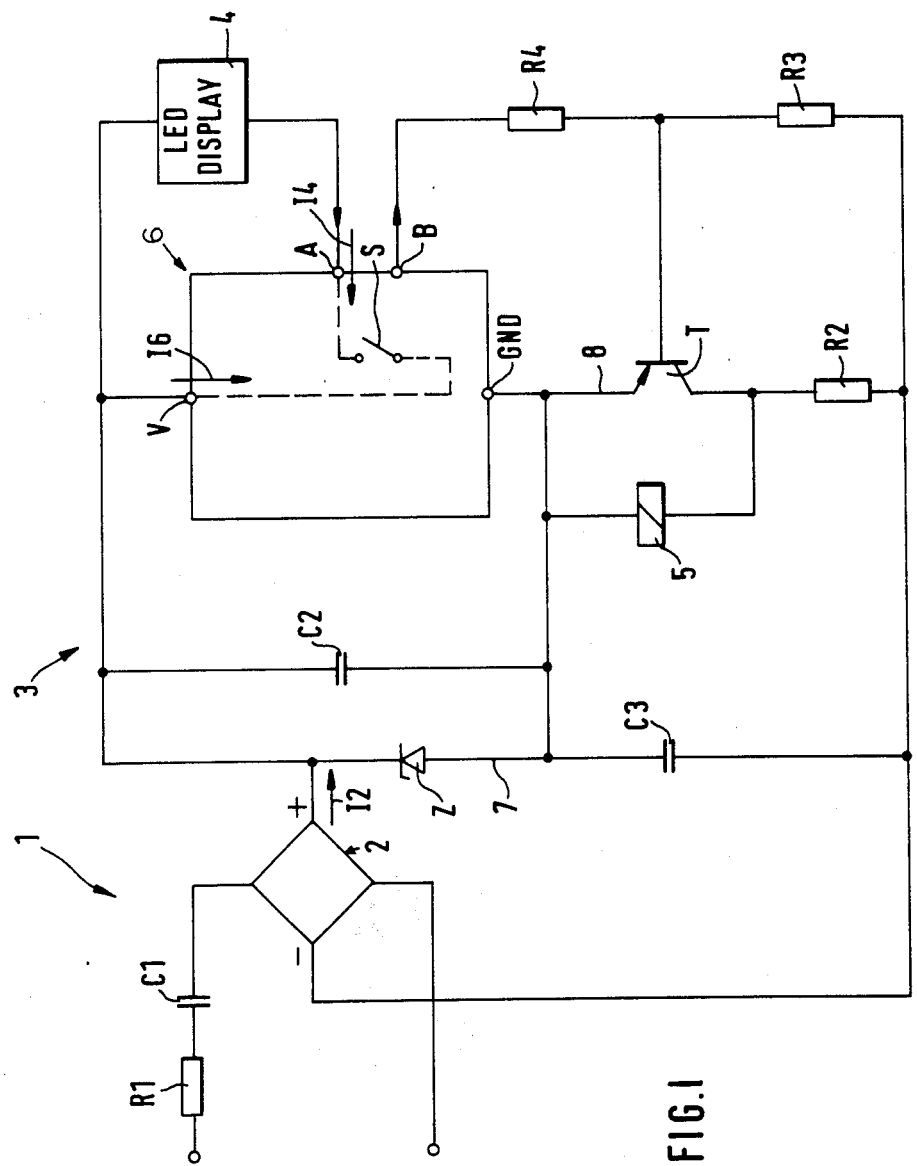

A capacitor power supply portion 1 which is connected to a main power supply includes an impedance R1, and a capacitor C1 which is connected in series therewith, as well as a rectifier 2.

A power user or consumer circuit 3 is connected to the rectifier 2, wherein the consumer circuit includes as a power or current consumer a display unit 4; for example, an LED-display, a relay 5, and a control device 6. The control device 6 controls the on-off switching of the display unit 4 and of the relay 5; for example, in a time-dependent mode.

The control device or circuit 6, in the exemplary embodiment, is formed by a microcomputer. The main current flow through the microcomputer is indicated in the drawing through the dash lines. Hereby, reference numeral 16 identifies the path of the supply current of the microcomputer flowing between the terminal V and the terminal GND. The current path 14 is the current flowing between a terminal A, to which there is connected the display unit 4, and the connector or terminal GND. Provided in the current path 14 is a switch S internally within the microcomputer, which switches the display unit 4 on and off.

The terminal V and the display unit 4 are located at the positive pole of the rectifier 2. The display unit 4 and the microcomputer 6 are connected in parallel with respect to the supply current of the microcomputer.

Arranged between the positive pole of the rectifier 2 and the terminal GND of the control circuit 6, is a branch line 7 which includes a zener diode Z. Thus, the branch line 7 is arranged in parallel with the display unit 4 and the control circuit 6. Moreover, connected in parallel therewith is a filter and storage capacitor C2.

Connected to the terminal GND is the relay 5, the latter of which is connected through a series impedance R2 to the negative pole of the rectifier 2. Arranged in parallel with the relay 5 in a branch line 8, is the emitter-collector section of a transistor T. The base of the transistor is connected to a voltage divider consisting of impedances R3, R4. The impedance R3 is connected to the negative pole of the rectifier 2. The impedance R4 is connected with a control connection or terminal B of the microcomputer. A further filter capacitor C3 is arranged in parallel with the series circuit of the relay 5 with the series impedance R2.

In general, the display unit 4 and the relay 5 are thus connected in series between the positive pole and the negative pole of the rectifier 2. In the same manner are the branch lines 7, 8 connected in series between the positive pole and the negative pole of the rectifier 2.

The current demand of the relay 5 does not lie, for example, above 80 mA. The current demand of the LED-display 44 does not lie, for example, above 70 mA; the current demand of the microcomputer 6 does not lie, for example, above 10 mA. Consequently, it is sufficient when the capacitor C1 is dimensioned such that it will superimpose, through the rectifier 2 of the consumer circuit 3, a current of 80 mA.

The mode of operation of the above-described circuit is generally as follows:

When the display unit 4 is switched on through the switch S by the microcomputer 6, and the relay 5 is thereby actuated, such that the transistor T is blocked as the result of an applicable signal at the control terminal B, then the zener diode Z is blocked. The current 12 flows across the LED-display 4 and the microcomputer 6 through the relay 5.

When the control input B is switched over by microcomputer 6, the transistor T then becomes conductive. As a result thereof, the relay 5 is shorted or short-circuited. The current which is necessary for the microcomputer 6 and the LED-display 4 is now conducted across the transistor T.

When the transistor T is switched non-conductively by the microcomputer 6, then the switch S is simultaneously opened, and the LED-display 4 will then switch off. The current 16 flowing through the microcomputer will in itself not be sufficient to maintain or to switch the relay 5 into the desired switched-on condition. However, the voltage at the zener diode 7 concurrently rises above its zener voltage, so that the current which is necessary for the relay 5 will flow through the branch line 8 to the relay 5. Thusly, the current 12 at the output of the rectifier 2 divides itself into a smaller part current 16 for the microcomputer 6 and into the part current which flows through the zener diode 7 directly to the relay 5.

When the microcomputer 6 concurrently switches off the LED-display 4 as well as the relay 5, the transistor T is then switched conductively across the impedance R3, and the zener diode 7 conducts current. There further flows the supply current 16 for the microcomputer 6. The superimposed current 12 can flow off. As a result, there are avoided any undesirable voltage rises.

What is claimed is:

1. Electronic switch apparatus comprising:
   (a) capacitor power supply circuit having output terminals for superimposing a current on a consumer circuit;
   (b) said consumer circuit coupled to said capacitor power supply circuit comprising,
      (1) a plurality of current consumers individually actuatable by a control circuit coupled to each of said current consumers, at least a first and a second current consumer of said plurality of current consumers being connected in series across said output terminals;
      (2) branch lines connected in parallel with each of said current consumers respectively, at least a first and a second branch line of said branch lines being connected in parallel with respect to said first and second current consumers, each of said branch lines having current control means for rendering said respective branch lines non-conductive in response to said control circuit being actuated to permit sufficient current to flow through each of the current consumers to energize each of said current consumers;

whereby the first branch line conducts adequate current to energize the second current consumer when no current flows through said first current consumer or a current flows therethrough which is insufficient to energize the second current consumer.

2. A switch apparatus as claimed in claim 1, wherein said plurality of current consumers includes current consumers which require a comparatively high demand on current, said high demand current consumers being connected in series.

3. A switching apparatus as claimed in claim 1, wherein said plurality of current consumers includes current consumers of a lower current demand connected in parallel with the current consumers of a higher current demand.

4. A switch apparatus as claimed in claim 1, wherein the branch lines are connected in such a sequence that the current delivered by the capacitor power supply circuit will also flow when the current consumers which are connected in series do not conduct any current.

5. A switch apparatus as claimed in claim 1, wherein the current flow control means connected in at least one of said branch lines includes a switch controlled by the control device, said switch being simultaneously an on-off switch for a current consumer connected in parallel therewith, so as to short out said current consumer.

6. A switch apparatus as claimed in claim 1, wherein the current flow control means connected in at least one branch line includes a zener diode.

7. A switch apparatus as claimed in claim 1, wherein a filter capacitor is connected in parallel with each of said branch lines.

8. A switch apparatus as claimed in claim 1 wherein said current consumers includes a display subassembly, a relay and a control device.

* * * * *